US008102802B2

(12) United States Patent
Ratasuk et al.

(10) Patent No.: US 8,102,802 B2
(45) Date of Patent: Jan. 24, 2012

(54) METHOD AND APPARATUS FOR PROVIDING DOWNLINK ACKNOWLEDGMENTS AND TRANSMIT INDICATORS IN AN ORTHOGONAL FREQUENCY DIVISION MULTIPLEXING COMMUNICATION SYSTEM

(75) Inventors: Rapeepat Ratasuk, Hoffman Estates, IL (US); Amitava Ghosh, Buffalo Grove, IL (US); Weimin Xiao, Barrington, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 0 days.

(21) Appl. No.: 11/692,400

(22) Filed: Mar. 28, 2007

(65) Prior Publication Data

US 2007/0258540 A1 Nov. 8, 2007

Related U.S. Application Data

(60) Provisional application No. 60/798,485, filed on May 8, 2006.

(51) Int. Cl.
*H04W 4/00* (2009.01)
(52) U.S. Cl. ......................................... 370/329; 455/450
(58) Field of Classification Search .......... 370/329–337; 455/450–454
See application file for complete search history.

(56) References Cited

U.S. PATENT DOCUMENTS

| 5,546,423 | A  | * | 8/1996  | Sehier et al. .................. 375/141 |
|-----------|----|---|---------|------------------------------------------|
| 2002/0150091 | A1 | * | 10/2002 | Lopponen et al. ............. 370/389 |
| 2002/0172217 | A1 | * | 11/2002 | Kadaba et al. ................ 370/443 |
| 2004/0076170 | A1 | * | 4/2004  | Earnshaw et al. ............. 370/441 |
| 2004/0114566 | A1 | * | 6/2004  | Lim et al. ..................... 370/349 |
| 2005/0122898 | A1 | * | 6/2005  | Jang et al. .................... 370/218 |
| 2006/0007887 | A1 | * | 1/2006  | Kwon et al. .................. 370/329 |
| 2006/0133262 | A1 | * | 6/2006  | Sutivong et al. ............. 370/209 |
| 2006/0280256 | A1 |   | 12/2006 | Kwon et al.                              |
| 2007/0211667 | A1 | * | 9/2007  | Agrawal et al. ............... 370/335 |

FOREIGN PATENT DOCUMENTS

| WO | 2006026344 A1 | 3/2006 |
| WO | 2006031239 A1 | 3/2006 |

OTHER PUBLICATIONS

Telefonaktiebolaget LM Ericsson, Mar. 23, 2006, WIPO, WO 2006/031239.*

* cited by examiner

*Primary Examiner* — Steven Lim
(74) *Attorney, Agent, or Firm* — Steven A. May (57) ABSTRACT

A communication system provides downlink acknowledgments corresponding to uplink transmission using hybrid automatic repeat request to multiple users in an Orthogonal Frequency Division Multiplexing communication system, wherein a frequency bandwidth comprises multiple frequency sub-carriers, by spreading each acknowledgment of multiple acknowledgments with a selected spreading sequence of multiple spreading sequences to produce multiple spread acknowledgments, wherein each acknowledgment is intended for a different user of the multiple users, and distributing the multiple spread acknowledgments across the multiple frequency sub-carriers.

28 Claims, 9 Drawing Sheets

| SUBFRAME | TIME (ms) | GROUP ID |
|---|---|---|
| 0 | 0.5 | 1301 |
| 1 | 1 | 1301 |
| 2 | 1.5 | 1301 |
| 3 | 2 | 1401 |
| 4 | 2.5 | 1402 |
| 5 | 3 | 1403 |
| 6 | 3.5 | 1404 |
| 7 | 4 | 1405 |
| 8 | 4.5 | 1406 |
| 9 | 5 | 1501 |
| 10 | 5.5 | 1301 |
| 11 | 6 | 1301 |
| 12 | 6.5 | 1301 |
| 13 | 7 | 1401 |
| 14 | 7.5 | 1402 |
| 15 | 8 | 1403 |
| 16 | 8.5 | 1404 |
| 17 | 9 | 1405 |
| 18 | 9.5 | 1406 |
| 19 | 10 | 1501 |

TABLE 1

| MCS | MOD | ER |
|---|---|---|
| 0 | QPSK | 0.2987 |
| 1 | QPSK | 0.4978 |
| 2 | QPSK | 0.7467 |
| 3 | 16QAM | 0.7467 |

TABLE 2

| GROUP IDs | ALLOWED MCS | MAX USERS/TTI |
|---|---|---|
| 1201 | 0,1,2 | 2 |
| 1301-1306 | 0,1,2 | 2 |
| 1401 | 0,1,2 and 3 | 5 |

TABLE 3

METHOD AND APPARATUS FOR PROVIDING DOWNLINK ACKNOWLEDGMENTS AND TRANSMIT INDICATORS IN AN ORTHOGONAL FREQUENCY DIVISION MULTIPLEXING COMMUNICATION SYSTEM

CROSS-REFERENCE(S) TO RELATED APPLICATION(S)

The present application claims priority from provisional application Ser. No. 60/798,485, entitled "METHOD AND APPARATUS FOR PROVIDING DOWNLINK ACKNOWLEDGMENTS AND TRANSMIT INDICATORS IN AN ORTHOGONAL FREQUENCY DIVISION MULTIPLEXING COMMUNICATION SYSTEM," filed May 8, 2006, which is commonly owned and incorporated herein by reference in its entirety.

FIELD OF THE INVENTION

The present invention relates generally to Orthogonal Frequency Division Multiplexing (OFDM) communication systems and, in particular, to provision of downlink acknowledgments and transmit indicators in an OFDM communication system.

BACKGROUND OF THE INVENTION

The IEEE (Institute of Electrical and Electronics Engineers) 802.16 standards propose using an Orthogonal Frequency Division Multiple Access (OFDMA) for transmission of data over an air interface. OFDMA also has been proposed for use in 3GPP (Third Generation Partnership Project) Evolution communication systems. In an OFDMA communication system, a frequency bandwidth is split into multiple contiguous frequency sub-carriers that are transmitted simultaneously. A user may then be assigned one or more of the frequency sub-carriers for an exchange of user information, thereby permitting multiple users to transmit simultaneously on the different sub-carriers. These sub-carriers are orthogonal to each other, and thus intra-cell interference is minimized.

In such systems, voice data is exchanged via Voice over Internet Protocol (VoIP). It is known to improve such systems for VoIP traffic using hybrid automatic repeat request (HARQ) error correction schemes and smaller packet sizes. While VoIP users have the same benefits of advanced link adaptation and statistical multiplexing as data users, the greatly increased number of users that may be served because of the smaller voice packet sizes places a burden on control and feedback mechanisms of the system. For example, it can be easily envisioned that 30 times as many voice packets, and corresponding users, could be served in a given frame than data packets. There are typically about 1600 bytes for data and about 40-50 bytes for voice. However, present downlink resource allocation and acknowledgment mechanisms typically allocate a resource block per user for conveyance of acknowledgments and therefore are not designed to handle such a large number of allocations and consume an inordinate amount of power and bandwidth in order to guarantee accurate detection and decoding at an edge of a cell.

Therefore, a need exists for a method and apparatus that provide for downlink resource allocation and acknowledgments to multiple users and further guarantee accurate detection and decoding at an edge of a cell without consuming an inordinate amount of system power and bandwidth.

DETAILED DESCRIPTION OF THE INVENTION

To address the need for a method and an apparatus that provide for downlink resource allocation and acknowledgments to multiple users and further guarantee accurate detection and decoding at an edge of a cell without consuming an inordinate amount of system power and bandwidth, a communication system is provided that provides downlink acknowledgments corresponding to uplink transmission using hybrid automatic repeat request to multiple users in an Orthogonal Frequency Division Multiplexing communication system, wherein a frequency bandwidth comprises multiple frequency sub-carriers, by spreading each acknowledgment of multiple acknowledgments with a selected spreading sequence of multiple spreading sequences to produce multiple spread acknowledgments, wherein each acknowledgment is intended for a different user of the multiple users, and distributing the multiple spread acknowledgments across the multiple frequency sub-carriers.

Generally, an embodiment of the present invention encompasses a method for providing downlink acknowledgments corresponding to uplink transmission using hybrid automatic repeat request to multiple users in an Orthogonal Frequency Division Multiplexing (OFDM) communication system wherein a frequency bandwidth comprises multiple frequency sub-carriers. The method includes spreading each acknowledgment of multiple acknowledgments with a selected spreading sequence of multiple spreading sequences to produce multiple spread acknowledgments, wherein each acknowledgment is intended for a different user of the multiple users, and distributing the multiple spread acknowledgments across the multiple frequency sub-carriers.

Another embodiment of the present invention encompasses a method for receiving an acknowledgment corresponding to uplink hybrid automatic repeat request transmission in an OFDM communication system wherein a frequency bandwidth comprises multiple frequency sub-carriers. The method includes monitoring a downlink control channel informing a user equipment (UE) of an uplink grant, determining the UE is scheduled to transmit data during a given time period based on the uplink grant, and transmitting data during the time period. The method further includes receiving an acknowledgment corresponding to the UE's uplink transmission via multiple sub-carriers, wherein the acknowledgment comprises a spreading sequence associated with the UE and wherein the spreading sequence is distributed over the multiple sub-carriers in the frequency bandwidth, and decoding the acknowledgment using a selected acknowledgment sequence number.

Yet another embodiment of the present invention encompasses a method for a method for assigning a resource block in an OFDM communication system. The method includes assembling a resource assignment message having multiple transmit indicators, wherein a position of each transmit indicator in the message corresponds to a resource unit assigned to a UE, and conveying the resource assignment message using an uplink grant data field on a downlink control message.

Still another embodiment of the present invention encompasses a wireless network element that provides downlink acknowledgments corresponding to uplink transmission using hybrid automatic repeat request to multiple users in an OFDM communication system wherein a frequency bandwidth comprises multiple of frequency sub-carriers. The wireless network element includes a processor that is configured to use a first resource unit number assigned to a UE in an uplink grant to select an acknowledgment spreading sequence number, spread each acknowledgment of multiple acknowledgments with a selected spreading sequence of multiple spreading sequences to produce multiple spread acknowledgments, wherein each acknowledgment is intended for a different user of the multiple users, and distribute the multiple spread acknowledgments across the multiple frequency sub-carriers.

Yet another embodiment of the present invention encompasses a user equipment (UE) that receives an acknowledgment corresponding to uplink hybrid automatic repeat request transmission in an OFDM communication system wherein a frequency bandwidth comprises multiple frequency sub-carriers. The user equipment includes a processor that is configured to monitor a downlink control channel informing the UE of an uplink grant, determine that the UE is scheduled to transmit data during a given time period based on the uplink grant, transmit data during the time period, receive an acknowledgment corresponding to the UE's uplink transmission via multiple sub-carriers, wherein the acknowledgment comprises a spreading sequence associated with the UE and wherein the spreading sequence is distributed over the multiple sub-carriers in the frequency bandwidth, and decode the acknowledgment using a selected acknowledgment sequence number.

Still another embodiment of the present invention encompasses a wireless network element that assigns a resource block in an OFDM communication system. The wireless network element includes a processor that is configured to assemble a resource assignment message having multiple transmit indicators, wherein a position of each transmit indicator in the message corresponds to a resource unit assigned to a UE, and convey the resource assignment message using an uplink grant data field on a downlink control message.

Figure 1:
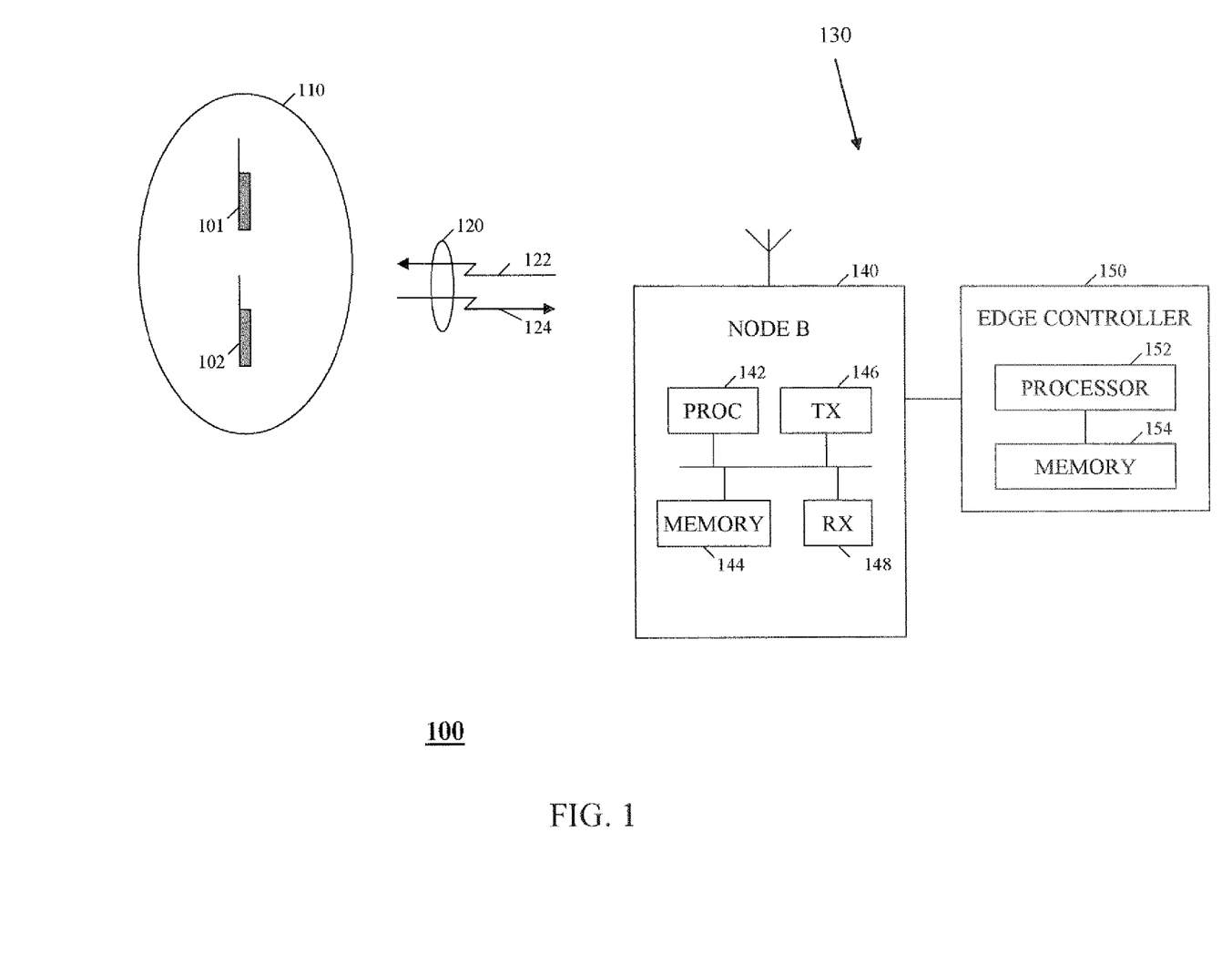
FIG. 1 is a block diagram of a wireless communication system in accordance with an embodiment of the present invention.

The present invention may be more fully described with reference to FIGS. 1-12. FIG. 1 is a block diagram of a wireless communication system 100 in accordance with an embodiment of the present invention. Communication system 100 includes multiple user equipment (UEs) 101, 102 (two shown) that are each associated with a user, such as but not limited to a cellular telephone, a radio telephone, a personal digital assistant (PDA) with radio frequency (RF) capabilities, or a wireless modem that provides RF access to digital terminal equipment (DTE) such as a laptop computer. Communication system 100 further includes a wireless communications network 130 that provides communication services to each of UEs 101 and 102 via an air interface 120. Network 130 includes a Node B 140 in wireless communication with UEs 101 and 102 and further includes an edge gateway 150 in communication with the Node B. Each of Node B 104 and edge gateway 150 may be referred to as an element of wireless network 140. Air interface 120 comprises a downlink 122 and an uplink 124. Each of downlink 122 and uplink 124 comprises multiple physical communication channels, including multiple reference and control channels, including at least one shared control channel, and multiple traffic channels.

Node B 140 and edge gateway 150 each includes a respective processor 142, 152, such as one or more microprocessors, microcontrollers, digital signal processors (DSPs), combinations thereof or such other devices known to those having ordinary skill in the art. The particular operations/functions of processors 142 and 152, and respectively thus of Node B 140 and edge gateway 150, are determined by an execution of software instructions and routines that are stored in a respective at least one memory device 144, 154 associated with the processor, such as random access memory (RAM), dynamic random access memory (DRAM), and/or read only memory (ROM) or equivalents thereof, that store data and programs that may be executed by the corresponding processor. Node B 140 further comprises at least one transmitter 146 and at least one receiver 148 for transmission and reception of information via air interface 120.

Figure 2:
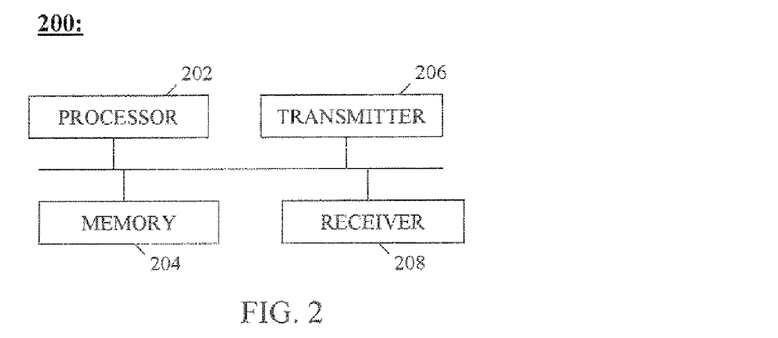
FIG. 2 is a block diagram of a user equipment in accordance with an embodiment of the present invention.

FIG. 2 is a block diagram of a user equipment (UE) 200, such as UEs 101 and 102, in accordance with an embodiment of the present invention. UE 200 includes a processor 202, such as one or more microprocessors, microcontrollers, digital signal processors (DSPs), combinations thereof or such other devices known to those having ordinary skill in the art. The particular operations/functions of processor 202, and respectively thus of UE 200, is determined by an execution of software instructions and routines that are stored in a respective at least one memory device 204 associated with the processor, such as random access memory (RAM), dynamic random access memory (DRAM), and/or read only memory (ROM) or equivalents thereof, that store data and programs that may be executed by the corresponding processor. UE 200 further comprises at least one transmitter 206 and at least one receiver 208 for transmission and reception of information via air interface 120.

Unless otherwise specified herein, the embodiments of the present invention preferably are implemented within UEs 101 and 102, Node B 140, and edge gateway 150, and more particularly with or in software programs and instructions stored in the respective at least one memory device 204, 144, 154 and executed by the respective processors 202, 142, 152 of the UEs, Node B, and edge gateway. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UEs 101 and 102, Node B 140, and edge gateway 150. Based on the present disclosure, one skilled in the art will be readily capable of producing and implementing such software and/or hardware without undo experimentation.

Communication system 100 comprises a wideband packet data communication system that employs an Orthogonal Frequency Division Multiplexing (OFDM) modulation scheme for transmitting data over air interface 120. Preferably, communication system 100 is an Orthogonal Frequency Division Multiple Access (OFDMA) communication system, wherein a frequency bandwidth is split into multiple frequency sub-carriers that comprise the physical layer channels over which traffic and signaling channels are transmitted in a TDM or TDM/FDM fashion. A user may then be assigned one or more of the frequency sub-carriers for an exchange of bearer information, thereby permitting multiple users to transmit simultaneously on the different set of sub-carriers such that each user's transmission is orthogonal to the other users' transmissions. Further, communication system 100 preferably operates in accordance with the 3GPP (Third Generation Partnership Project) E-UTRA (Evolutionary UMTS Terrestrial Radio Access) standards, which standards specify wireless telecommunications system operating protocols, including radio system parameters and call processing procedures. However, those who are of ordinary skill in the art realize that communication system 100 may operate in accordance with any wireless telecommunication system employing an Orthogonal Frequency Division Multiplexing (OFDM) modulation scheme, such as a 3GPP2 (Third Generation Partnership Project 2) Evolution communication system, for example, a CDMA (Code Division Multiple Access) 2000 1XEV-DV communication system, a Wireless Local Area Network (WLAN) communication system as described by the IEEE (Institute of Electrical and Electronics Engineers) 802.xx standards, for example, the 802.11a/HiperLAN2, 802.11g, or 802.16 standards, or any of multiple proposed ultrawideband (UWB) communication systems.

Communication system further provides for guaranteed delivery of data packets conveyed over air interface 120, for example, by use of any well known guaranteed-delivery protocol such as an automatic repeat request (ARQ) protocol or a hybrid ARQ (HARQ) protocol. As is known in the art, such protocols use acknowledgments, such as an ACK and/or a NACK, to identify data packets that have been correctly received, erroneously received, or not received.

In order to selectively schedule the multiple UEs 101, 102 for use of one or more sub-carriers of a frequency bandwidth employed by communication system 100, network 130, and in particular Node B 140, provides each UE 101, 102 with an downlink control message, preferably an uplink scheduling grant, via a control channel of downlink 122. The grant includes a UE identifier (UE ID), scheduling information for a scheduling period, an uplink resource assignment, a duration of the assignment, uplink transmission parameters, and an acknowledgment (ACK/NACK) response corresponding to HARQ. The UE ID indicates a UE (or a group of UEs) for which the grant is intended. The uplink transmission parameters indicate transmission parameters, such as a modulation scheme, a payload size, MIMO-related information, and so on, that the identified UE (or group of UEs) shall use. The scheduling information typically includes a reference start time, preferably in units of radio frames such as a starting Cell System Frame Number (SFN) index or a starting Connection Frame Number (CFN) index, a scheduling duration, that is, a duration of a time period during which the provided scheduling information is applicable, for example, in units of radio frames or Transmission Time Intervals (TTIs), and an allocated uplink resource unit. In one embodiment of the present invention, the UE may be expressly informed of an uplink resource unit and/or a downlink acknowledgment channel to be monitored by the UE. In another embodiment of the present invention, the uplink resource unit and/or the downlink acknowledgment channel to be monitored by the UE may be implicit based on information included in the grant, such as the downlink acknowledgment channel being indicated based on the uplink resource unit assigned to the UE.

Figure 3:
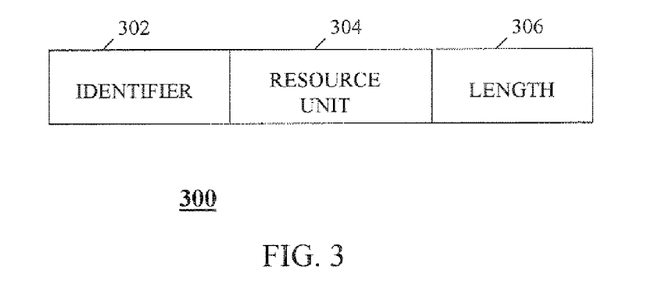
FIG. 3 is a block diagram of an exemplary uplink resource assignment message in accordance with an embodiment of the present invention.

For example, FIG. 3 is a block diagram of an uplink grant 300, such as a first resource assignment message, in accordance with an embodiment of the present invention. Uplink resource assignment message 300 is assembled by Node B 140 and conveyed by the Node B to a UE, such as UEs 101 and 102, in order to inform the UE of an allocated uplink resource unit. Uplink grant 300 provides scheduling information (resource unit assignment) for a scheduling period and includes a first data field 302 comprising a UE identifier, a second data field 304 comprising uplink resource unit assignment information, and a third data field 306 comprising message length information. The uplink resource unit assignment information identifies an uplink resource unit assigned to the UE intended as a recipient of the message. As is known in the art, in an OFDMA communication system, a resource unit comprises one or more frequency sub-carriers in a frequency bandwidth that may assigned to a user for an exchange of user information.

Figure 4:
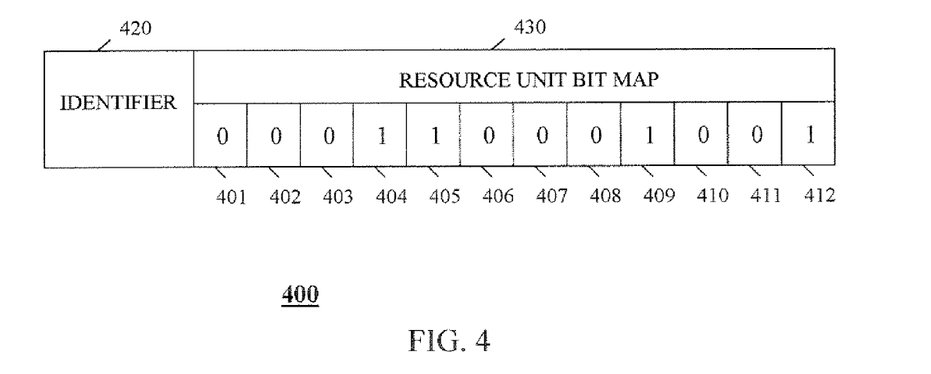
FIG. 4 is a block diagram of an exemplary uplink resource assignment message in accordance with another embodiment of the present invention.

By way of another example, FIG. 4 is a block diagram of an uplink grant 400, such as a second resource assignment message, in accordance with another embodiment of the present invention. Similar to uplink resource assignment message 300, uplink grant 400 is assembled by Node B 140 and conveyed by the Node B to a UE, such as UEs 101 and 102, in order to inform the UE of an allocated uplink resource unit. Uplink grant 400 also provides scheduling information for a scheduling period and includes a first data field 420 comprising a UE identifier and a second data field 430 comprising an uplink resource unit bit map. Uplink resource unit bit map 430 comprises multiple data fields 401-412 that are each associated with a 0/1 bit sequence that is used to map each resource unit (RE) assigned to the UE identified in the message, such as UE 101 or UE 102. That is, each data field 401-412 provides an indication whether a resource unit associated with that data field is assigned to the UE during a next scheduling period, such as a Transmission Time Interval (TTI) or a radio frame transmission period.

Figure 5:
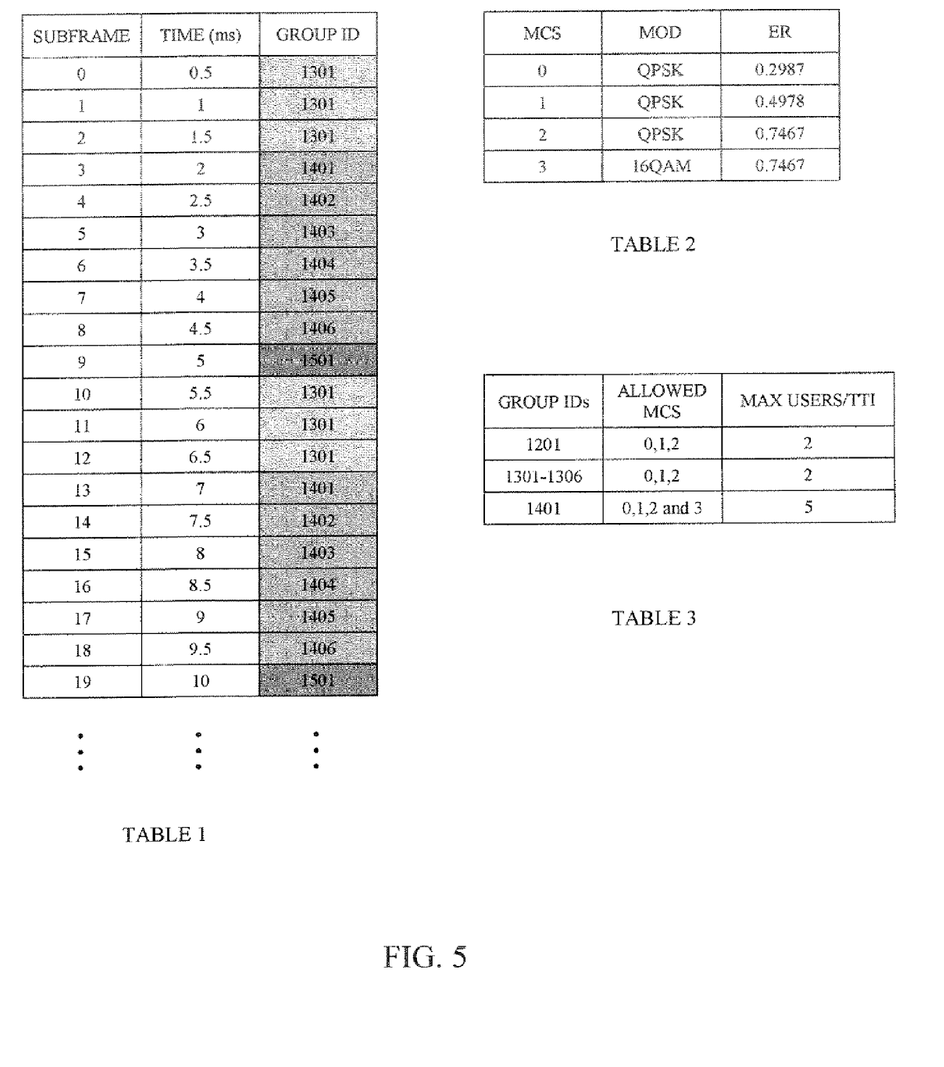
FIG. 5 is a table diagram illustrating an exemplary group scheduling setup in accordance with an embodiment of the present invention.

Each of UEs 101 and 102 may be a member of a group of UEs 110. FIG. 5 is a table diagram illustrating an exemplary group scheduling setup in accordance with an embodiment of the present invention. UEs in this setup are initially classified into three separate groups based on their path loss (this information can inferred from downlink C/I or downlink pilot SNR measurements). That is, UEs with group ID 1301 are in the worst channel conditions for example, have the highest path loss, UEs with group ID 1501 are in the most favorable channel conditions, and UEs with group IDs 1401-1406 are in intermediate channel conditions. Once a UE is assigned a group ID, the UE only needs to 'wake up' according to a predetermined pattern specific to that group ID. For instance, a UE with group ID 1401 may wake up every $10^{th}$ subframe while a UE with group ID 1301 may wake up for 3 subframes in every 10 subframes. In each 0.5 millisecond (ms) subframe, one (1) long block (LB) is reserved for control signaling and the remaining five (5) LBs are shared among different UEs for data transmission. As an example, resources within a particular subframe are shared in a TDM fashion, that is, if two UEs share a subframe, one UE is allocated two (2) LBs and the other UE is allocated three (3) LBs. A UE scheduled in a particular subframe then is allowed to transmit using only those modulation coding scheme (MCS) levels that are allowed for its group (as shown in Table 3 of FIG. 5). One may note that with this setup, information about which exact MCS to use and which exact resources to transmit in can be conveyed to the UEs scheduled in a particular subframe by using a simple bit map whose length is equal to the number of UEs that have been assigned a particular group ID associated with that subframe. One may further note that, as the UEs transmit their packets, a scheduler can get a better idea about the channel conditions and uplink interference for each UE using ACK/NACK information. For instance, if the scheduler notices that a UE with group ID 1401 is dropping packets, it can move that UE to group 1301 which has more resources reserved for it (thereby allowing more retransmission opportunities). A grouping of UEs is described in further detail in U.S. patent application Ser. No. 11/243,033, filed Oct. 4, 2005 and entitled "Scheduling in Wireless Communication Systems," which application is assigned to the assignee of the present invention and is hereby incorporated herein in its entirety.

Based on the uplink grant, a UE, such as UEs 101 and 102, is able to determine a downlink acknowledgment (ACK/NACK) channel associated with, and to be monitored by, the UE. A downlink acknowledgment channel is contained within the shared control channel allocation at the beginning of the sub-frame. Also, distributed allocation is used for the acknowledgment channel. ACK/NACK transmissions are code-multiplexed using orthogonal sequences. To achieve maximum frequency diversity and avoid strong interference at a particular frequency range, ACK/NACK transmissions are code-multiplexed using orthogonal sequences or low or zero correlation sequences within a predefined time frequency region that is distributed across the entire OFDM symbol. Code Division Multiplexing (CDM) allows for easy power assignment/stealing between acknowledgments for different users. Different acknowledgments remain orthogonal or minimally correlated in the downlink so there is minimal interference from other acknowledgments. The number of required spreading sequences is dependent on the maximum number of data streams in the uplink (including MIMO operation). This includes data streams that are multiplexed into a resource region assigned to a group. For instance, 16 users may be multiplexed into one group with 8 users transmitting at the same time. Note that only one group is active within a TTI. As an example, for a 5 MHz system, 24 unique acknowledgements may be supported using a GCL sequence of length 24 that are uniformly distributed throughout 300 available sub-carriers of an OFDMA communication system.

The UE determines the downlink acknowledgment channel based on the resource units assigned to the UE in the uplink grant. For example, suppose a spreading code comprising a CAZAC (Constant Amplitude Zero Auto-Correlation) sequence is being utilized for uplink transmissions by a UE. Since there are a limited number of time shifts of a CAZAC sequence, only a limited number of uplink resource units may be assigned to the UE. For example, in uplink grant 400, the multiple data fields 401-412 that are each used to map a resource unit (RE) may each correspond to a time shift of a CAZAC sequence. Thus each data field of the twelve data fields 401-412 of resource bit map 430 corresponds to one of twelve time shifts, including a no shift position, of a CAZAC sequence in a shifting of the sequence a full cycle. Each time shift comprises an assignable uplink channel and each UE 101, 102 knows, that is, maintains in the UE's at least one memory device 204, the time shift of the CAZAC sequence corresponding to each 0/1 bit sequence in the bit map. Network 130, and in particular Node B 140, then informs a UE, such as one of UEs 101 and 102, that is the intended recipient of the message, of the uplink resource units been assigned to the UE for a given time period by including an appropriate value, for example, an appropriate bit, in each bit sequence 401-412 of bit map 430. Thus, each bit sequence 401-412 may be thought of as a transmit indicator for the UE. In turn, a UE, such as UEs 101 and 102, is able to determine whether it has been scheduled to transmit via uplink 124, and further determine the uplink channel assigned to the UE during the time period, based on the transmit indicators included in the uplink resource assignment message.

For example, as depicted in message 400, "1's" are embedded in data fields 404, 405, 409, and 412, and "0's" are embedded in data fields 401-403, 406-408, 410, and 411. A "1" corresponds to an assignment of an uplink resource unit during a next scheduling period and a "0" corresponds to a failure to assign an uplink resource unit during the next scheduling period for that particular UE. Based on bit map 430, a UE identified in data field 420, such as UE 101, knows to use uplink resource units 404, 405, 409, and 412 during the next scheduling period. The UE, that is, UE 101, then always looks for a downlink 122 acknowledgment (ACK/NACKs) of an uplink 124 transmission of the UE using an ACK/NACK sequence ID that is based on the UEs first resource unit assignment in the resource assignment message received by the UE. That is, with reference to bit map 430, Node B 140 conveys an acknowledgment to UE 101 on downlink 122, and UE 101 looks for an acknowledgment on downlink 122, using sequence number 4, which sequence corresponds to the first resource unit assignment, that is, resource unit 404, in the uplink grant conveyed by the Node B to the UE. In other words, each UE 101, 102 maintains, in the at least one memory device 204 of the UE, a list of spreading codes/sequences, such as Walsh codes or CAZAC sequences, and any time shifts associated with such spreading codes/sequences, that may be assigned as uplink data channels and downlink acknowledgment channels and an association between such spreading codes/sequences/time shifts and the bit sequences in bit map 430. Based on a received resource unit assignment message, a UE assigned a resource unit may determine, based on an uplink resource unit assignment, a corresponding downlink acknowledgment (ACK/NACK) channel to monitor for acknowledgments.

By way of another example and further with respect to uplink grant 400, suppose the uplink grant is used to assign uplink resource units to members of a group of UEs or to both non-group member UEs and members of a group of UEs. Further, suppose a first set of data fields 401-408, and a corresponding first set of spreading sequences, are reserved for use by individual users, or UEs, and a second set of data fields 409-412, and a corresponding second set of spreading sequences, are reserved for use by members of the group. As used herein, different spreading sequences comprise spreading sequences that may be differentiated based on values included in the sequence or code or based on different time shifts applied to a same sequence or code. The non-group users will receive their uplink resource unit assignments as described in detail above, except that they will not be assigned, and will not look for, uplink resource units associated with data fields 409-412. On the other hand, rather than send an uplink grant to each individual member of the group, Node B 140 may send an uplink grant, such as uplink grant 400, to all members of the group. Each member of the group then decodes the grant and determines whether the member has been assigned an uplink resource unit, and a corresponding downlink acknowledgment channel, based on the member's position in the group. Again, each UE 101, 102 maintains, in the at least one memory device 204 of the UE, a list of spreading codes/sequences and any time shifts associated with such spreading codes/sequences, that may be assigned as uplink data channels and downlink acknowledgment channels and an association between such spreading codes/sequences/time shifts and the bit sequences in bit map 430.

That is, suppose that UE 101 is in a first position in the group, for example, group 110, and UE 102 is in a second position in the group. Further, suppose a spreading code comprising a CAZAC (Constant Amplitude Zero Auto-Correlation) sequence is being utilized by each UE in group 110 to transmit on the uplink. The CAZAC sequence is shared by, and known to, each UE in group 110 for uplink transmissions and there are only a limited number of possible time shifts of the code before the code is shifted a full cycle, for example, twelve possible time shifts. Again, each time shift comprises an assignable uplink channel and each UE that is a member of group 110 knows the time shift corresponding to that UE. As is known in the art, each UE that is a member of the group knows its position in the group, that is, a first UE, for example, UE 101, knows that it is the first UE in the group, a second UE, for example, UE 102, knows that it is the second UE in the group, and so on. Based on each UE's position in the group, each UE knows where to look in uplink resource unit bit map 430 for an assignment of an uplink resource unit to the UE. For example, first UE 101 knows that its corresponding bit in bit map 430 is a first bit sequence in the bit sequences reserved to the group, that is, bit sequence 409, second UE 102 knows that its corresponding bit in bit map 430 is a second bit sequence in the bit sequences reserved to the group, that is, bit sequence 410, and so on. Node B 140 then informs each UE that is a member of the group whether an uplink resource unit has been assigned to the UE for a given time period by including an appropriate value, for example, an appropriate bit, in the data field of bit map 430 corresponding to that UE. Thus, each value included in data fields 401-412 may be thought of as a transmit indicator for the associated UE. In turn, each UE 101-112 is able to determine whether it has been scheduled to transmit via uplink 124, and further determine an uplink channel assigned to the UE and a downlink acknowledgment channel to be monitored by the UE during the associated scheduling period, based on the transmit indicator associated with the UE. After informing a UE 101, 102 of the uplink resource unit(s) assigned to the UE and expressly or implicitly a downlink acknowledgment channel assigned to the UE, Node B 140 then acknowledges data received from the UE by code multiplexing acknowledgments intended for the UE by use of a spreading sequence or code, for example, an orthogonal code such as Walsh Code or a Walsh-Hadamard code, or a non-orthogonal but low or zero correlation code such as a CAZAC sequence, monitored by the UE and which spreading sequence or code is distributed across the frequency bandwidth. Further, each spreading code may be individually power controlled by Node B 140 across the frequency bandwidth during that scheduling period.

Figure 6:
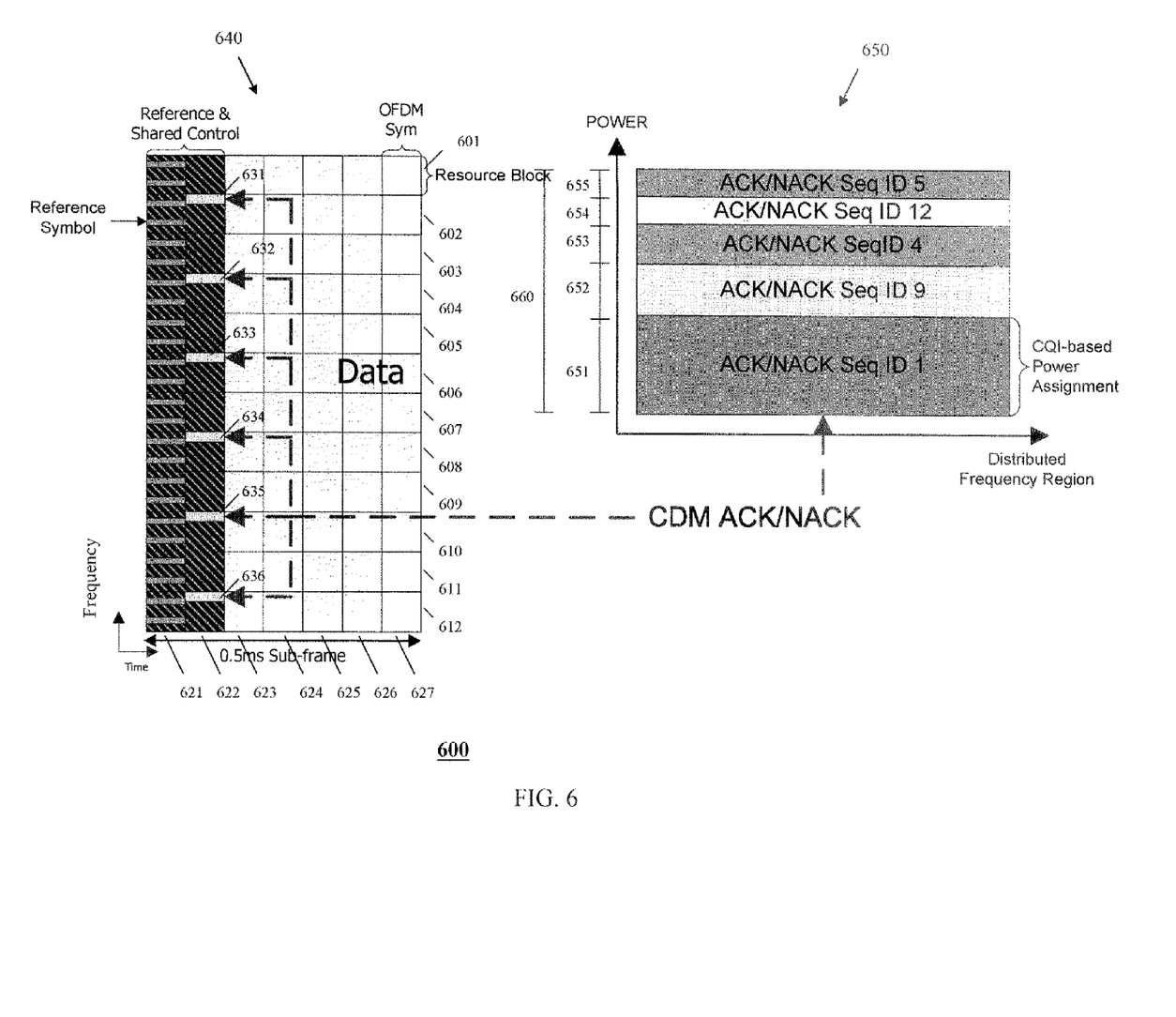
FIG. 6 is a block diagram depicting an exemplary spreading of multiple downlink acknowledgments across an OFDMA frequency bandwidth in accordance with an embodiment of the present invention.

Referring now to FIG. 6, an exemplary block diagram 600 is provided that illustrates a spreading of multiple downlink acknowledgments across an OFDMA frequency bandwidth in accordance with an embodiment of the present invention. FIG. 6 includes a time-frequency diagram 640 and a power distribution diagram 650. A vertical scale of time-frequency diagram 640 depicts multiple blocks 601-612 of frequency sub-carriers of a frequency bandwidth of communication system 100. A horizontal scale of time-frequency diagram 640 depicts multiple blocks 621-627 of time of a sub-frame that may be allocated. As depicted in time-frequency diagram 640, during a first time period corresponding to blocks of time 621 and 622, all of the multiple blocks 601-612 of frequency sub-carriers are reserved for reference and shared control signaling. That is, during blocks of time 621 and 622, all of the channels of communication system 100 are control channels. During a second time period corresponding to blocks of time 623-627, all of the multiple blocks 601-612 of frequency sub-carriers are available for a conveyance of data, such as VoIP data, to UEs 101, 102.

Power distribution diagram 650 depicts an allocation of power to each downlink acknowledgment channel assigned to a UE, such as UEs 101 and 102. As depicted in power distribution diagram 650, a first quantity of power 651 is allocated to a first spreading sequence, a second quantity of power 652 is allocated to a second spreading sequence, a third quantity of power 653 is allocated to a third spreading sequence, a fourth quantity of power 654 is allocated to fourth spreading sequence, and a fifth quantity of power 655 is allocated to a fifth spreading sequence, for a total power allocation 660 to the downlink acknowledgment channels during the next scheduling period. (For example, it is assumed here that data field 401 in uplink grant 400 includes a '1' rather than a '0.')

Preferably, power is allocated to each downlink acknowledgment channel based on a channel condition associated with the UE that is, in turn, associated with the downlink acknowledgment channel. For example, Node B 140 may determine a channel condition in association with each UE 101, 102 serviced by the Node B and active in a coverage area of the Node B. In one embodiment of the present invention, each UE 101, 102 may measure a downlink channel condition, preferably measuring Channel Quality Information (CQI) as is known in the art, associated with each sub-carrier of a bandwidth employed by communication system 100 to produce multiple downlink channel measurements. One of ordinary skill in the art realizes that many parameters may be measured in determining channel quality and that any such parameter may be used herein without departing from the spirit and scope of the present invention. As is known in the art, each UE 101, 102 measures channel conditions for each and every sub-band during a measuring period, such as a Transmission Time Interval (TTI) (also known as a sub-frame) or a radio frame transmission period. Each UE of the multiple UEs 101, 102 then reports the measured channel conditions for all of the sub-bands to serving network 130, and in particular to Node B 140, preferably in a Channel Quality Information (CQI) message.

In another embodiment of the present invention, Node B 140 may measure an uplink channel condition for each UE 101, 102 serviced by the Node B based on uplink transmissions received from the UE, such as an uplink pilot signal, an uplink control signal, or an uplink traffic signal. One of ordinary skill in the art realizes that there are many ways for a Node B to determine channel conditions associated with a UE serviced by the Node B, and any such method may be used herein without departing from the spirit and scope of the present invention.

Based on the channel condition measurements associated with each UE 101, 102, Node B 140 may determine a downlink transmit power level for the acknowledgment channel associated with the UE. Node B 140 then transmits acknowledgements to the UE via downlink 122 of air interface 120 at the downlink power level determined for the UE until a next downlink power level update period. For example, an OFDMA power allocation scheme is described in detail in U.S. patent application No. 60/759,800, filed on Jan. 18, 2006, and entitled "Method and Apparatus for Uplink Resource Allocation in a Frequency Division Multiple Access Communication System," which application is assigned to the assignee of the present invention and is hereby incorporated herein in its entirety. Although the power allocation scheme described therein is an uplink power allocation scheme, one of ordinary skill in the art can apply the power allocation scheme described therein to allocate downlink transmit power level for the acknowledgment channels allocated by communication system 100.

Referring again to FIG. 6, each acknowledgment sequence is then spread over multiple sub-carriers, that is, over at least one sub-carrier in each of multiple shared control channel resource blocks. Furthermore, the acknowledgment sequences utilized with respect to each of the multiple UEs allowed to transmit during a scheduling period and, therefore, allocated downlink acknowledgment channels, such as UEs 101 and 102, is spread over the same sub-carriers as the acknowledgment sequences utilized with respect to the other UEs of the multiple UEs allowed to transmit during the scheduling period and allocated downlink acknowledgment channels. For example, as depicted in FIG. 6, the acknowledgment sequences for each of the multiple UEs transmitting during the scheduling period, that is UEs 101 and 102, are spread over the sub-carriers 631-636 during block of time 622.

Figure 7:
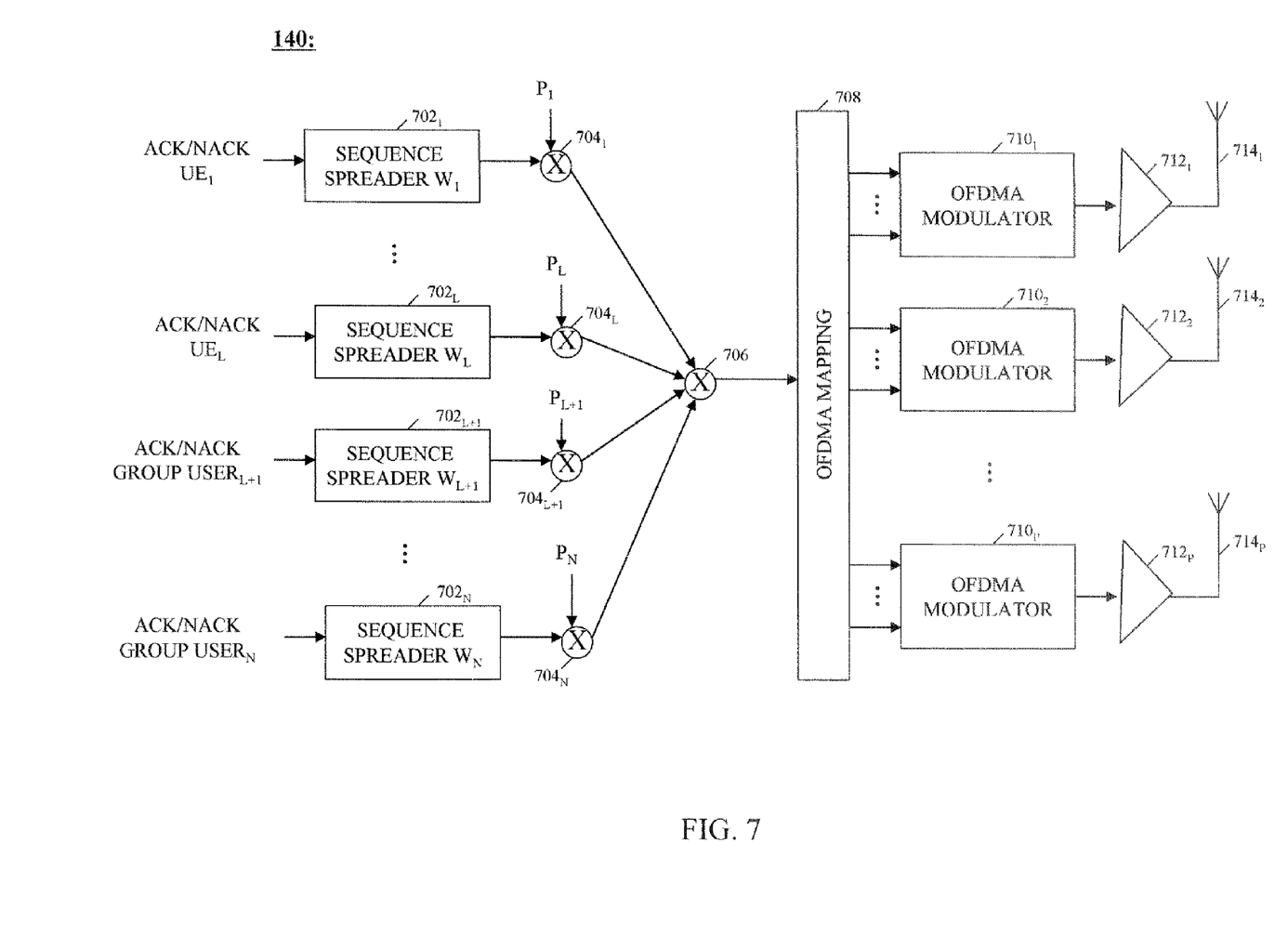
FIG. 7 is a block diagram of an architecture of a Node B of FIG. 1 in accordance with an embodiment of the present invention.
Figure 8:
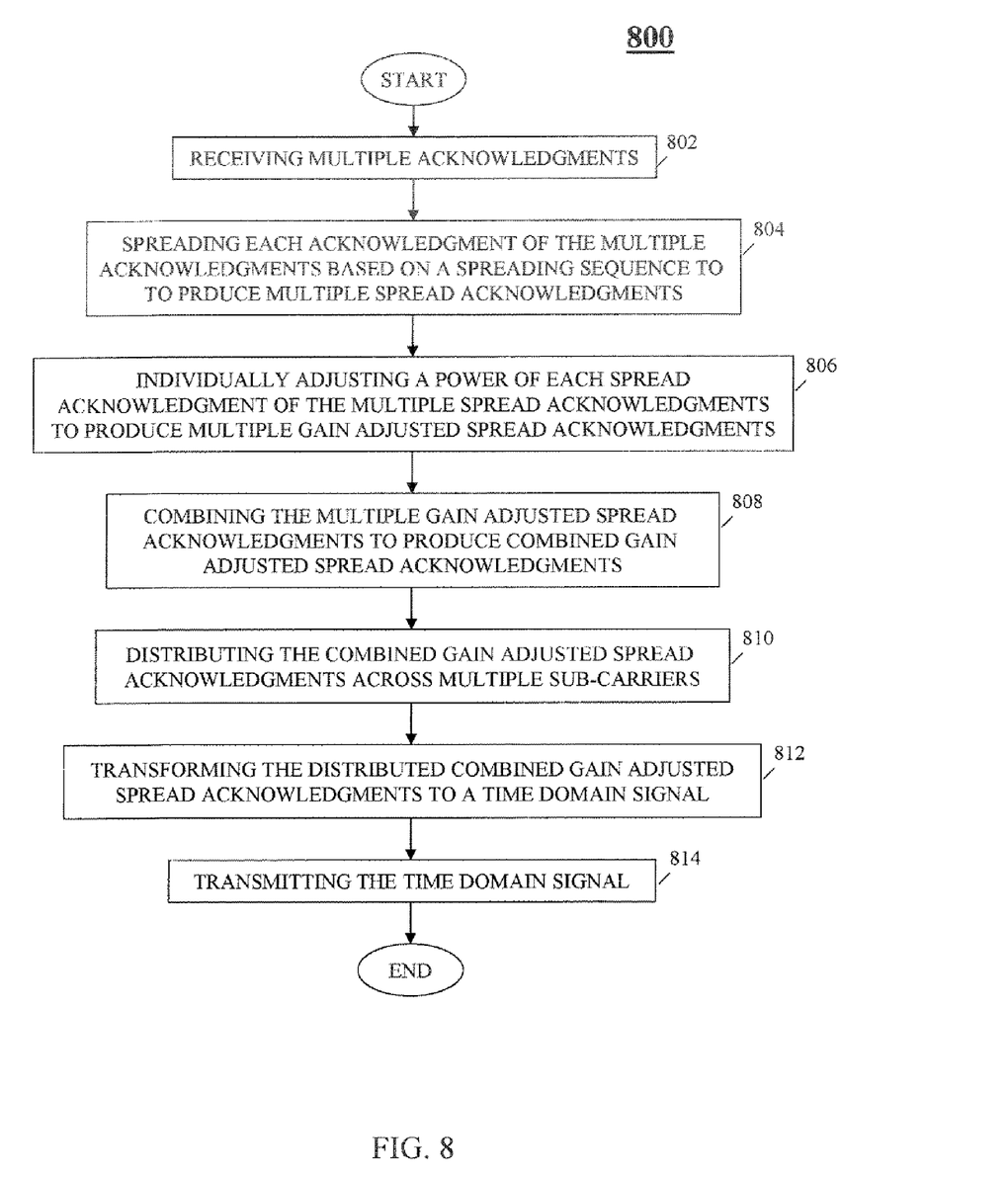
FIG. 8 is a logic flow diagram of a method executed by a Node B of FIG. 1 in conveying downlink acknowledgments to one or more users equipment of FIG. 1 in accordance with an embodiment of the present invention.

Referring now to FIGS. 7 and 8, an operation of Node B 140 in conveying downlink acknowledgments to one or more UEs, such as one or more of UEs 101, 102, is illustrated in accordance with an embodiment of the present invention. FIG. 7 is a block diagram of an architecture of Node B 140 in accordance with an embodiment of the present invention. Node B 140 includes multiple sequence spreaders $702_1$-$702_N$, wherein each sequence spreader of the multiple sequence spreaders $702_1$-$702_N$ is associated with a UE, such as UEs 101, 102, or a group of UEs, such as group 110. Each sequence spreader of the multiple sequence spreaders $702_1$-$702_N$ is coupled to a respective gain adjuster of multiple gains adjusters $704_1$-$704_N$ and, in turn, each of the multiple gain adjusters $704_1$-$704_N$ is coupled to a combiner 706. Combiner 706 is further coupled to an OFDMA mapping function 708 that is, in turn coupled to multiple OFDMA modulators $710_1$-$710_P$. Each OFDMA modulator of the multiple OFDMA modulators $710_1$-$710_P$ is further coupled to a respective power amplifier of multiple power amplifiers $712_1$-$712_P$, and each power amplifier of the multiple power amplifiers $712_1$-$712_P$ s is further coupled to a respective antenna of multiple antennas $714_1$-$714_P$. Preferably, each of the multiple sequence spreaders $702_1$-$702_N$, multiple gain adjusters $704_1$-$704_N$, combiner 706, OFDMA mapping function 708, and multiple OFDMA modulators $710_1$-$710_P$ is implemented in processor 142 of Node B 140 based on programs maintained in the at least one memory device 144 of the Node B. Further, preferably each of the multiple power amplifiers $712_1$-$712_P$ is implemented in the at least one transmitter 146 of the Node B.

FIG. 8 is a logic flow diagram 800 illustrating method executed by Node B 140 in conveying downlink acknowledgments to one or more UEs in accordance with an embodiment of the present invention. Logic flow diagram 800 begins when each sequence spreader $702_1$-$702_N$ of the Node B receives (802) an acknowledgment, such as one or more bits, intended for the associated UE or group and spreads (804) the received acknowledgment based on a respective predetermined spreading sequence $W_1$-$W_N$ to produce a spread acknowledgment. Each sequence spreader $702_1$-$702_N$ then conveys the spread acknowledgment to a respective gain adjuster $704_1$-$704_N$. Each gain adjuster $704_1$-$704_N$ adjusts (806) a power of the received spread acknowledgment based on the determined downlink transmit power level for the acknowledgment channel associated with the corresponding UE or group, as described in detail above, to produce a gain adjusted spread acknowledgment. Each gain adjuster $704_1$-$704_N$ then conveys the gain adjusted spread acknowledgment produced by the UE to a combiner 706, which combiner combines (808), for example, sums, the gain adjusted spread acknowledgments received from gain adjusters $704_1$-$704_N$ to produce combined gain adjusted spread acknowledgments.

Combiner 706 conveys the combined gain adjusted spread acknowledgments to an OFDMA mapping function 708. OFDMA mapping function 708 is coupled to multiple OFDMA modulators $710_1$-$710_P$. While the operation of OFDMA mapping function 708, OFDMA modulators $710_1$-$710_P$, power amplifiers $712_1$-$712_P$, and antennas $714_1$-$714_P$ is described herein with respect to a forward path through a OFDMA modulator $710_1$, power amplifier $712_1$, and antenna $714_1$, one of ordinary skill in the art realizes that the same signal processing applies to transmission of the combined gain adjusted spread acknowledgments through forward paths comprising any of OFDMA modulators $710_2$-$710_P$, power amplifiers $712_2$-$712_P$, and antennas $714_2$-$714_P$.

OFDMA mapping function 708 comprises a Serial-to-Parallel (S/P) converter. In response to receiving the combined gain adjusted spread acknowledgments from combiner 706, OFDMA mapping function 708 distributes (810) the combined acknowledgments across the frequency bandwidth. In other words, the combined gain adjusted spread acknowledgments are applied to multiple sub-carriers across the frequency bandwidth, rather than applying the acknowledgments to a single frequency sub-carrier or individually applying each acknowledgment to a separate, single frequency sub-carrier. In one embodiment of the present invention, OFDMA mapping function 708 applies a portion of the combined gain adjusted spread acknowledgments, that is, a portion of each gain adjusted spread acknowledgment of the combined gain adjusted spread acknowledgments, to each sub-carrier of multiple orthogonal sub-carriers, in effect converting a symbol stream from a serial to a parallel form and producing 'M' parallel acknowledgment streams, wherein M is the number of sub-carriers allocated for conveyance of the acknowledgments and each parallel stream comprises a different portion of the combined gain adjusted spread acknowledgment, that is, a portion of each gain adjusted spread acknowledgment of the combined gain adjusted spread acknowledgments. OFDMA mapping function 708 then applies the M parallel streams to OFDMA modulator $710_1$. In another embodiment of the present invention, OFDMA mapping function 708 may replicate the combined gain adjusted spread acknowledgments. OFDMA mapping function 708 then applies a replicated combined gain adjusted spread acknowledgment to each sub-carrier of multiple orthogonal sub-carriers, producing 'M' parallel acknowledgment streams, wherein M is the number of sub-carriers allocated for conveyance of the acknowledgments. OFDMA mapping function 708 then applies the M parallel streams to OFDMA modulator 710₁.

Figure 9:
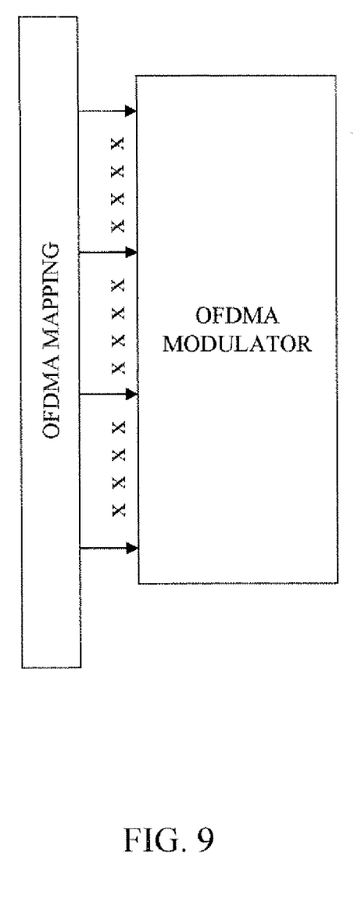
FIG. 9 is a block diagram of an OFDMA mapping function and an OFDMA modulator of FIG. 7 in accordance with an embodiment of the present invention.
Figure 10:
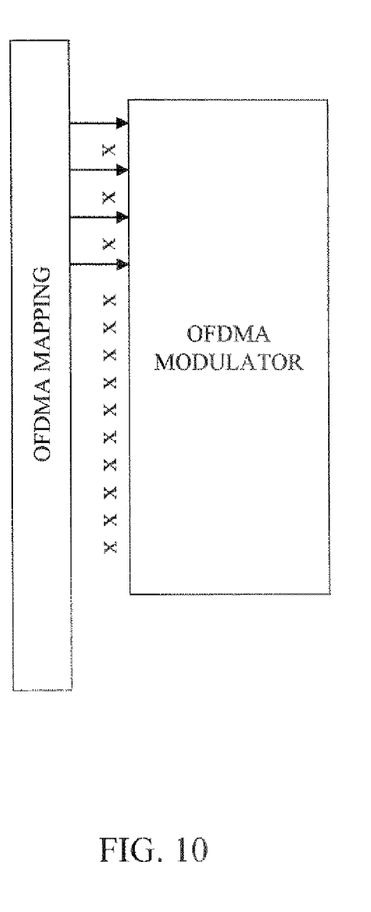
FIG. 10 is a block diagram of an OFDMA mapping function and an OFDMA modulator of FIG. 7 in accordance with another embodiment of the present invention.

Referring now to FIG. 9, in one embodiment of the present invention, OFDMA mapping function 708 may distribute the combined acknowledgments throughout the frequency bandwidth. Referring now to FIG. 10, in another embodiment of the present invention, OFDMA mapping function 708 may distribute the combined acknowledgments in a localized portion of the frequency bandwidth. An advantage of a localized distribution of the acknowledgments is that the interference generated by transmission of the combined acknowledgments over air interface 120 may then be better coordinated.

OFDMA modulator 710₁ transforms (812) each acknowledgment of the M parallel acknowledgments, each of which acknowledgments is assigned to a frequency sub-band, that is, a frequency domain sub-carrier, to a time domain signal, that is, a time domain sub-carrier, thereby producing multiple (M) modulated orthogonal time domain sub-carriers, wherein each sub-carrier corresponds to a sub-carrier included in the frequency bandwidth. The multiple orthogonal frequency sub-bands $f_n(t)$, n=0, 1, . . . , M-1 can be thought of as sinusoids or complex exponentials of the form $e^{j2\pi(W/M)nt}$ for $t \in [0, T_{total}]$ where W is the available frequency bandwidth and W/M expresses the frequency spacing between subcarriers.

As known in OFDM systems, the functionality of OFDMA modulator 710₁ may be implemented with an inverse fast Fourier transform (IFFT), or alternatively with an inverse discrete Fourier transform (IDFT). The M parallel symbols are provided as input to the IFFT and the IFFT outputs M parallel time domain sub-carriers of frequency $f_n$, wherein each sub-carrier of the M parallel sub-carriers is modulated by a corresponding input acknowledgment of the M parallel input symbols. OFDMA modulator 710₁ then converts the modulated time domain sub-carriers constituting the IFFT output to a serial form to produce a baseband output signal that the OFDMA modulator 710₁ upconverts from a baseband frequency to a transmit frequency ($f_c$) to produce an upconverted output signal. The upconverted signal is conveyed to power amplifier 712₁. Power amplifier 712₁ amplifies the signal to produce an amplified signal and transmits (814) the amplified signal to the UEs being provided acknowledgments, that is, UEs 101, 102, via antenna 714₁ and downlink 122 of air interface 120. Logic flow 800 then ends. However, in another embodiment of the present invention, Node B 140 may further apply a different cyclic shift to the signal applied to each antenna 714₁-714ₚ, thereby providing cyclic shift transmit diversity and further reducing the interference of the transmitted downlink signals with each other and providing improved reception at the UEs. Cyclic shift transmit diversity is well-known in the art and will not be described in greater detail herein.

Figure 11:
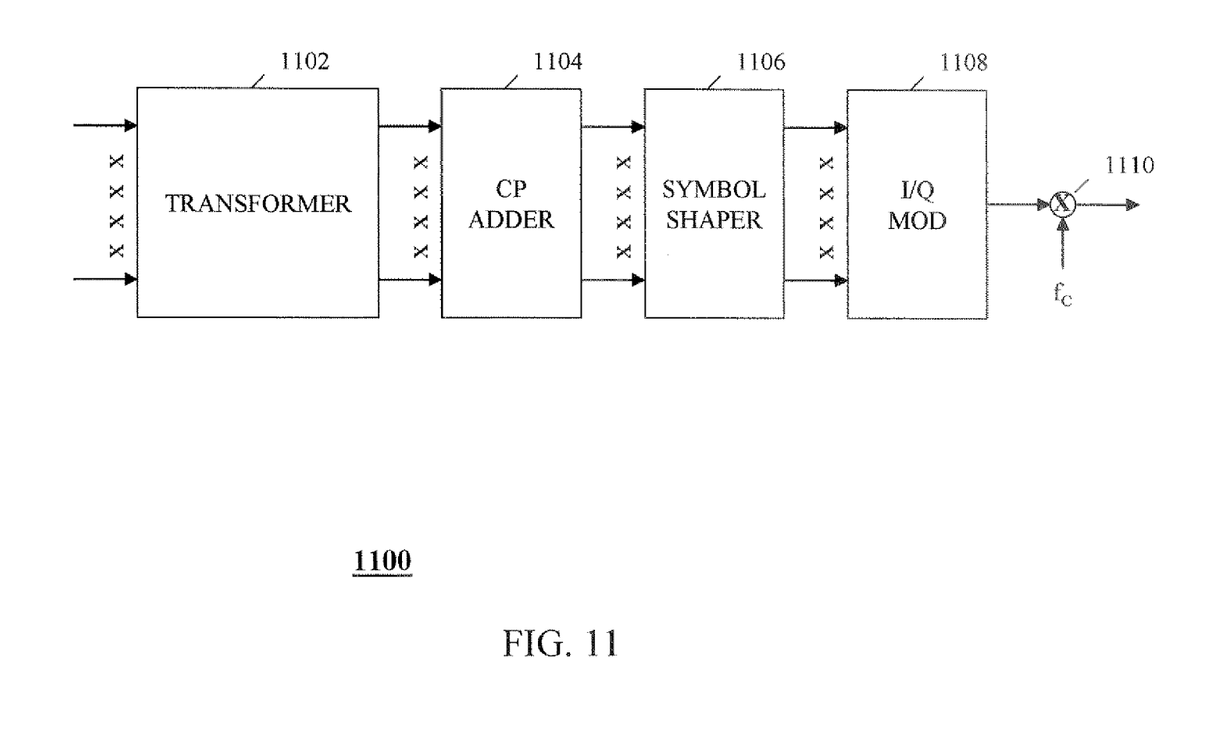
FIG. 11 is a block diagram of an exemplary OFDMA modulator of FIG. 7 in accordance with an embodiment of the present invention.

OFDMA modulators, such as OFDMA modulators 710₁-710ₚ, are well-known in the art. For example, FIG. 11 is a block diagram of an exemplary OFDMA modulator 1100, such as OFDMA modulators 710₁-710ₚ, in accordance with an embodiment of the present invention. OFDMA modulator 1100 comprises a transformer 1102, such as an IFFT, coupled to a cyclic prefix (CP) adder 1104. CP adder A04 is coupled to a symbol shaper 1106, the symbol shaper is further coupled to an I/Q modulator 1108, and the I/Q modulator is further coupled to an upconverter 1110. As described above, OFDMA modulator 1100 receives multiple parallel streams of acknowledgments from OFDMA mapping function 708, wherein each parallel stream comprises acknowledgments for all UEs being conveyed an acknowledgment, such as UEs 101 and 102. OFDMA modulator 1100 routes the multiple parallel acknowledgment streams to transformer 1102, which transforms each acknowledgment streams of the multiple parallel acknowledgment streams, each of which acknowledgment streams is assigned to a frequency sub-carrier, that is, a frequency domain sub-carrier, to a time domain signal, that is, a time domain sub-carrier, thereby producing multiple (M) modulated orthogonal time domain sub-carriers. Transformer 1102 then routes each time domain sub-carriers of the modulated orthogonal time domain sub-carriers to CP adder 1104. CP adder appends a guard band interval, or cyclic prefix, to each received signal and conveys the appended signals to symbol shaper 1106. Symbol shaper 1106 shapes each signal received from CP adder 1104 in accordance with well-known techniques and conveys the shaped signal to I/Q modulator 1108. I/Q modulator 1108 then produces an in-band (I) signal and a quadrature (Q) signal for each signal received from symbol shaper 1106 and converts the signals from a parallel form to a serial form that the I/Q modulator 1108 then routes to upconverter 1110. Upconverter 1110 upconverts the signal received from I/Q Modulator 1108 from a baseband frequency to a transmit frequency ($f_c$) to produce an upconverted output signal that then is conveyed to a power amplifier, such as power amplifiers 712₁-712ₚ.

Figure 12:
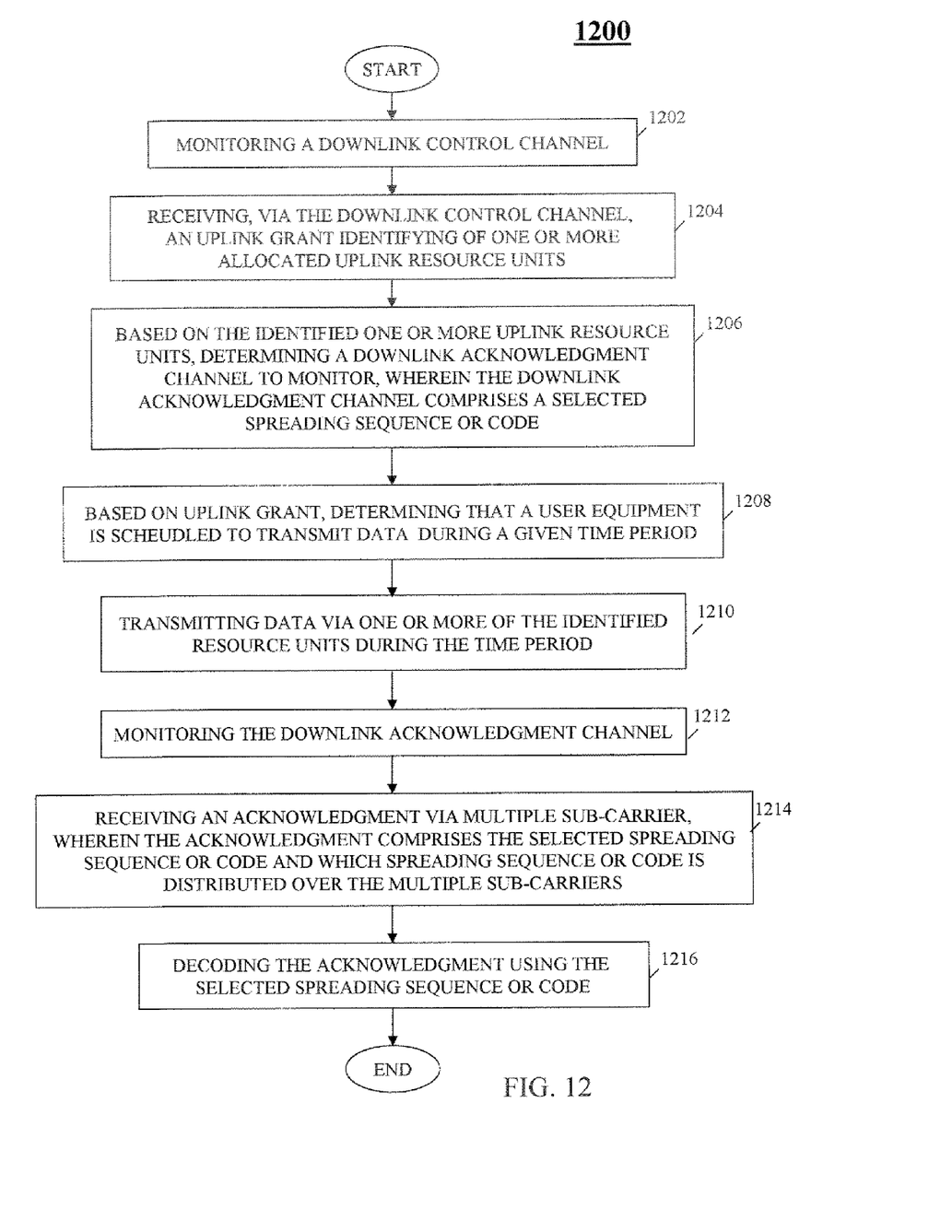
FIG. 12 is a logic flow diagram illustrating a reception of an acknowledgment by a user equipment of FIG. 1 that has been scheduled for a downlink acknowledgment channel during a given time period in accordance with an embodiment of the present invention.

FIG. 12 is a logic flow diagram 1200 illustrating a reception of an acknowledgment by a UE, such as UEs 101 and 102, that has been scheduled for a downlink acknowledgment channel during a given time period in accordance with an embodiment of the present invention. Logic flow 1200 begins when the UE monitors (1202) a downlink control channel and receives (1204), via the downlink control channel, an uplink grant informing the UE of one or more allocated uplink resource units. As described in detail above, the uplink grant provides scheduling information (resource unit assignment) for a scheduling period and includes a UE identifier and uplink resource unit assignment information, such as one or more identified uplink resource units or one or more transmit indicators. Based on the one or more identified uplink resource units or one or more transmit indicators, the UE determines (1206) a downlink acknowledgment channel to monitor, which downlink acknowledgment channel comprises a selected spreading sequence or code corresponding to a selected acknowledgment sequence number. Further, based on the received uplink grant, the UE determines (1208) that it is scheduled to transmit data during a given time period based on the uplink grant and transmits (1210) data via one or more of the identified uplink resource units during the time period.

In response to transmitting the data, the UE monitors (1212) the determined downlink acknowledgment channel and receives (1214) an acknowledgment corresponding to the UE's uplink transmission via multiple sub-carriers, wherein the acknowledgment comprises the spreading sequence or code associated with the UE and determined by the UE based on the one or more identified uplink resource units or one or more transmit indicators and wherein the spreading sequence or code is distributed over the multiple sub-carriers in the frequency bandwidth. The UE then decodes (1216) the acknowledgment using the selected spreading sequence or code, and logic flow diagram 1200 then ends.

By spreading each acknowledgment of multiple acknowledgments with a selected spreading sequence of multiple spreading sequences to produce multiple spread acknowledgments, wherein each acknowledgment is intended for a different UE of multiple UEs, and distributing the multiple spread acknowledgments across the multiple frequency subcarriers of when transmitting the acknowledgments to user equipment via a downlink, and further individually power controlling each acknowledgment multiple spread acknowledgments, communication system 110 provides for downlink resource allocation and acknowledgments to multiple users and further guarantees accurate detection and decoding at an edge of a cell without consuming an inordinate amount of system power and bandwidth. As used herein, different spreading sequences comprise spreading sequences that may be differentiated based on values included in the sequence or code or based on different time shifts applied to a same sequence or code. The UE may be expressly notified of a downlink acknowledgement channel comprising the spreading sequence to be monitored by the UE, or the UE implicitly may determine a downlink acknowledgment channel based on an uplink resource unit allocation in an uplink grant that is conveyed to the UE via a downlink control channel. Further, the grant may explicitly identify the uplink resource unit(s) allocated to the UE or may implicitly identify the uplink resource unit(s) allocated to the UE based on a transmit indicator included in the grant. In addition, when the UE is allocated multiple uplink resource units, the downlink acknowledgment channel to be monitored by the UE may comprise a downlink acknowledgment channel associated with a first resource unit of the multiple resource units allocated to the UE. Furthermore, when the UE is a member of a group, the UE may determine the uplink resource unit(s) allocated to the UE, and correspondingly the downlink acknowledgment channel to be monitored by the UE, based on an uplink grant conveyed to the members of the group and a position of the UE in the group.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for providing downlink acknowledgments corresponding to uplink transmission using hybrid automatic repeat request to a plurality of users in an Orthogonal Frequency Division Multiplexing communication system wherein a frequency bandwidth comprises a plurality of frequency sub-carriers, the method comprising:
spreading each acknowledgment of a plurality of acknowledgments with a selected spreading sequence of a plurality of spreading sequences to produce a plurality of spread acknowledgments;
using a first resource block number of a plurality of resource blocks assigned to a user equipment in an uplink scheduling grant and for an uplink transmission to select a downlink acknowledgment channel number for the user equipment; and
distributing the plurality of spread acknowledgments across the plurality of frequency sub-carriers.

2. The method of claim 1, wherein the plurality of spreading sequences are associated uniquely with a plurality of users.

3. The method of claim 1, further comprising choosing a transmission power of the spread acknowledgement sequence for a user based on a received Channel Quality Information of the user.

4. The method of claim 1, wherein each spreading sequence of the plurality of spreading sequences is orthogonal to the other spreading sequences of the plurality of spreading sequences.

5. The method of claim 1, wherein each spreading sequence of the plurality of spreading sequences comprises a CAZAC sequence.

6. The method of claim 1, wherein a first set of spreading sequences are used for individual user equipment a second set of spreading sequences are used by members of a group of user equipment.

7. The method of claim 1, wherein the uplink scheduling grant is provided via a Physical Downlink Control Channel.

8. A method for receiving an acknowledgment corresponding to uplink hybrid automatic repeat request transmission in an Orthogonal Frequency Division Multiplexing communication system wherein a frequency bandwidth comprises a plurality of frequency sub-carriers, the method comprising:
monitoring a downlink control channel informing a user equipment (UE) of an uplink grant;
determining the UE is scheduled to transmit data during a given time period based on the uplink grant;
transmitting data during the time period;
receiving a downlink acknowledgment corresponding to the UE's uplink transmission via a plurality of sub-carriers, wherein the acknowledgment comprises a spreading sequence associated with the UE and wherein the spreading sequence is distributed over the plurality of sub-carriers in the frequency bandwidth; and
decoding the acknowledgment using a selected acknowledgment sequence number, wherein decoding comprises determining the acknowledgment spreading sequence number based on a first resource unit number of a plurality of resource units assigned to a user equipment in the uplink grant and wherein the first resource unit number is assigned to the user equipment for an uplink transmission.

9. The method of claim 8, wherein the spreading sequence is orthogonal to spreading sequences used to convey acknowledgments to other user equipment via the same multiple sub-carriers.

10. The method of claim 8, wherein the spreading sequence comprises a CAZAC sequence with a time shift that is different than time shifts applied to acknowledgments conveyed to other user equipment via the same multiple sub-carriers.

11. The method of claim 8, wherein the spreading sequence used depends upon whether or not the user equipment is a member of a group.

12. The method of claim 8, further comprising determining the selected acknowledgment sequence number based on a first resource unit assigned to the user equipment.

13. A method for assigning a resource block in an Orthogonal Frequency Division Multiplexing communication system comprising:

assembling a resource assignment message having a plurality of transmit indicators, wherein each transmit indicator of the plurality of transmit indicators identifies a corresponding resource unit of a plurality of resource units by a position of the transmit indicator in the message and wherein a value is assigned to each transmit indicator of the plurality of transmit indicators that indicates whether the corresponding resource unit is assigned to a user equipment;

conveying the resource assignment message using an uplink grant data field on a downlink control message; and using a first resource unit of a plurality of resource units, assigned to a user equipment for an uplink transmission, to select a downlink acknowledgment spreading sequence for the user equipment.

14. The method of claim 13, wherein conveying the resource assignment message comprises conveying the resource assignment message via a Physical Downlink Control Channel.

15. A wireless network element that provides downlink acknowledgments corresponding to uplink transmission using hybrid automatic repeat request to a plurality of users in an Orthogonal Frequency Division Multiplexing communication system wherein a frequency bandwidth comprises a plurality of frequency sub-carriers, wherein the wireless network element comprises a processor that is configured to use a first resource block number of a plurality of resource blocks assigned to a user equipment in an uplink scheduling grant and for an uplink transmission to select a downlink acknowledgment channel number for the user equipment, spread each acknowledgment of a plurality of acknowledgments with a selected spreading sequence of a plurality of spreading sequences to produce a plurality of spread acknowledgments, and distribute the plurality of spread acknowledgments across the plurality of frequency sub-carriers.

16. The wireless network element of claim 15, wherein the uplink scheduling grant is provided via a Physical Downlink Control Channel.

17. The wireless network element of claim 15, wherein the plurality of spreading sequences are associated uniquely with a plurality of users.

18. The wireless network element of claim 15, wherein the processor is further configured to choose a transmission power of the spread acknowledgement sequence for a user based on a received Channel Quality Information of the user.

19. The wireless network element of claim 15, wherein each spreading sequence of the plurality of spreading sequences is orthogonal to the other spreading sequences of the plurality of spreading sequences.

20. The wireless network element of claim 15, wherein each spreading sequence of the plurality of spreading sequences comprises a CAZAC sequence.

21. The wireless network element of claim 15, wherein a first set of spreading sequences are used for individual user equipment a second set of spreading sequences are used by members of a group of user equipment.

22. A user equipment (UE) that receives an acknowledgment corresponding to uplink hybrid automatic repeat request transmission in an Orthogonal Frequency Division Multiplexing communication system wherein a frequency bandwidth comprises a plurality of frequency sub-carriers, the user equipment comprising a processor that is configured to monitor a downlink control channel informing the UE of an uplink grant, determine that the UE is scheduled to transmit data during a given time period based on the uplink grant, transmit data during the time period, receive an acknowledgment corresponding to the UE's uplink transmission via a plurality of sub-carriers, wherein the acknowledgment comprises a spreading sequence associated with the UE and wherein the spreading sequence is distributed over the plurality of sub-carriers in the frequency bandwidth, and decode the acknowledgment using a selected acknowledgment sequence number, wherein the processor is configured to determine the acknowledgment spreading sequence number based on a first resource unit number of a plurality of resource units assigned to a user equipment in the uplink grant and wherein the first resource unit number is assigned to the user equipment for an uplink transmission.

23. The user equipment of claim 22, wherein the spreading sequence is orthogonal to spreading sequences used to convey acknowledgments to other user equipment via the same multiple sub-carriers.

24. The user equipment of claim 22, wherein the spreading sequence comprises a CAZAC sequence with a time shift that is different than time shifts applied to acknowledgments conveyed to other user equipment via the same multiple sub-carriers.

25. The user equipment of claim 22, wherein the spreading sequence used depends upon whether or not the user equipment is a member of a group.

26. The user equipment of claim 22, wherein the selected acknowledgment sequence number is based on a first resource unit assigned to the user equipment.

27. A wireless network element that assigns a resource block in an Orthogonal Frequency Division Multiplexing communication system, the wireless network element comprising a processor that is configured to assemble a resource assignment message having a plurality of transmit indicators, wherein each transmit indicator of the plurality of transmit indicators identifies a corresponding resource unit of a plurality of resource units by a position of the transmit indicator in the message, to assign a value to each transmit indicator of the plurality of transmit indicators that indicates whether the corresponding resource unit is assigned to a user equipment, convey the resource assignment message using an uplink grant data field on a downlink control message, and use a first resource unit of a plurality of resource units assigned to a user equipment for an uplink transmission to select a downlink acknowledgment spreading sequence for the user equipment.

28. The wireless network element of claim 27, wherein the processor is configured to convey the downlink control message via a Physical Downlink Control Channel.

* * * * *